United States Patent Office 3,427,947
Patented Feb. 18, 1969

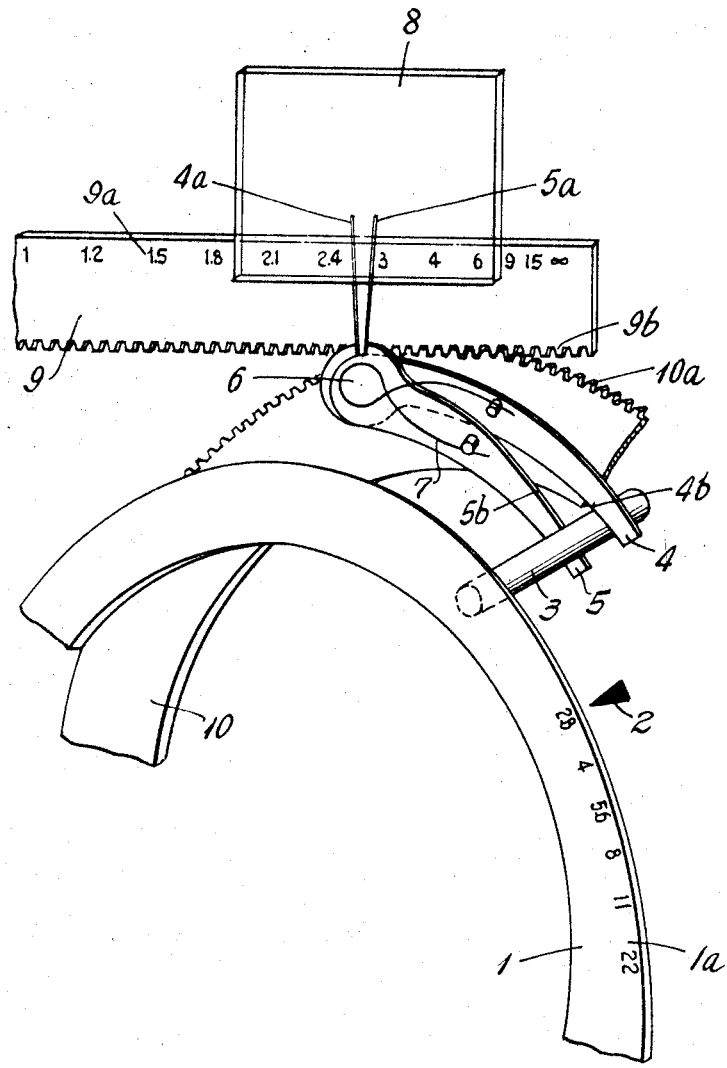

3,427,947
DEVICE FOR INDICATING THE DEPTH-OF-FIELD
RANGE FOR PHOTOGRAPHIC CAMERAS
Waldemar Racki, Calmbach, Black Forest, Germany, assignor to Prontor-Werk Alfred Gauthier, G.m.b.H., Calmbach, Black Forest, Germany
Filed Jan. 21, 1966, Ser. No. 522,184
Claims priority, application Germany, Feb. 5, 1965, G 42,760
U.S. Cl. 95—44　　　　　　　　　　　　　　　6 Claims
Int. Cl. G03b 3/08

ABSTRACT OF THE DISCLOSURE

A device for indicating the depth-of-field range for photographic cameras fixes the indicators on two shear-like levers positioned about a fixed pin. The lever edges face each other. The control edges of the two levers are held against a control pin by a spring. The control pin is situated on an actuating ring for the diaphragm setting mechanism.

---

The present invention relates to a device for indicating the depth-of-field range for photographic cameras. The device comprises two indicators moving in opposite directions during the setting of the diaphragm, and a distance scale which is associated with the indicators and which changes with the lens setting.

In a known device of this type, each indicator is situated on a separate, a slide-like carrier. The two carriers are, in turn, coupled to two coaxial levers which are spread apart by a disc cam to a lesser or greater degree. The disc cam rotates in response to an exposure meter built into the camera with the result that the movement of the indicators are oppositely directed.

This known indicating device requires improvements because of the problems arising from the arrangement of the indicators and the articulated connection of slides to the actuating levers. Thus, this arrangement makes it necessary to overcome large resisting forces in the form of friction in bearings and articulated joints, when the indicators are being displaced. Aside from this, the design presents difficulties due to the comparatively short lever arms of the cam and small distance between the pivot of the levers and the point at which the cam contacts the latter. Thus, this design makes it necessary to exert comparatively large forces for spreading apart the levers.

It is therefore an object of the present invention to solve these problems and eliminate the aforementioned disadvantages of the known device by providing a device in which the indicators can be moved with a minimum amount of force and with the least possible number of structural elements.

The present invention solves these problems essentially through the arrangement in which the indicators are fixed on two shear-like levers positioned about a fixed pin. The lever edges which face each other, are designed in the form of control cams. A control pin is situated on an actuating ring that is movable with the diaphragm setting mechanism. The control edges of the two levers are held against the control pin due to the effect of a spring. This arrangement makes it possible to reduce to a minimum the amount of resistance which counteracts the displacing motion of the indicators. Thus, the design makes it possible to dispense with special guides or articulated joints for the indicators. Another advantage of the present invention resides in the fact that the control pin is seated on a comparatively large lever arm and is therefore able to act on the two levers at a comparatively large distance from their pivot point. In this manner, the indicators can be displaced with an extremely small force.

Details of the invention will become apparent from the specification which follows with reference to the accompanying drawing which shows a perspective view of an embodiment of the invention.

In accordance with the drawing, an actuating ring 1 is provided for acting upon the diaphragm of a photographic camera. For purposes of clarity, the diaphragm is not shown in the drawing. The actuating ring is provided with a diaphragm scale 1a cooperating with a setting mark 2 situated on the camera.

The actuating ring 1 serves to set the diaphragm and act upon a device designed to indicate the depth of field. This device is built into the camera, and in conjunction with it a control pin 3 is arranged parallel to the rotational axis of the actuating ring, and fixed to the latter. The indicating device includes two indicators 4a and 5a arranged on two shear-like levers 4 and 5. These levers are positioned on a fixed pin 6. The edges 4b and 5b which face each other and correspond to levers 4 and 5 are constructed in the form of control cams. These cams hold the two levers in engagement with control pin 3, due to the action of a spring 7 situated about fixed pin 6. The indicators 4a and 5a are arranged so that they are visible in the view finder 8 of the camera for every spread-apart position of the levers 4 and 5.

For the purpose of reading the depth-of-field range in the view finder 8 of the camera, a distance scale 9a associated with indicators 4a and 5a, can be observed in the view finder and moved by means of a slide 9. Slide 9 may be made of transparent material and functionally connected to the device for setting the distance of the camera. Thus slide 9 may consist of a rack-like member 9b meshing directly with the gearing 10a of a ring 10 fixed to the distance setting member which is manually operated. One or more pinions may be included between the ring 10 and slide 9, for purposes of adapting the path of motion and direction of the slide, to the specific spatial conditions prevailing in the camera.

Upon setting the diaphragm, control pin 3 slides along control cams 4b and 5b. The levers 4 and 5 are thereby spread-apart to a greater or lesser degree depending on the size of the diaphragm to be set. This spreading motion is transmitted, to the same degree, to indicators 4a and 5a. Upon the diaphragm being set, for example, to the value 22 the indicators are in the most spread-apart position. During the setting of the distance, slide 9 moves synchronously with the distance setting member. After the distance is set, the range, visible in view finder 8 and sharply focused while the photograph is being taken, is displayed on the distance scale 9a by the two indicators 4a and 5a.

In the present embodiment, the diaphragm scale 1a is linear while the distance scale 9a has non-linear characteristics. The two scales may be made to correspond in a simple manner, without additional means, through appropriate formation of the cam surfaces 4b and 5b.

What is claimed is:

1. A device for indicating the depth-of-field range for photographic cameras with diaphragm setting mechanism comprising: an actuating ring for said diaphragm setting mechanism; a control pin secured on said actuating ring; two levers pivoting about a fixed point and engaging said control pin; two indicators moving in opposite directions during the setting of said diaphragm, said two indicators being fixed to said two levers; and a distance scale associated with said indicators and changing with said distance setting.

2. The device of claim 1 wherein said levers are situated shear-like relative to one another on a fixed pin serving as a common pivot point for said levers.

3. The device of claim 2 wherein said levers have edges facing one another, and said edges are in the form of control cams.

4. The device of claim 1 including a spring for maintaining said levers in engagement with said control pin.

5. The device of claim 1 wherein said levers have edges facing one another, said edges being in form of control cams and being held in contact with said control pin by means of a spring.

6. The device of claim 1 wherein said distance scale is of transparent material.

References Cited

UNITED STATES PATENTS 2,916,981 12/1959 Schutz et al. _____ 95—64
3,161,119 12/1964 Mahn _____ 95—45

JOHN M. HORAN, *Primary Examiner.*

FRED L. BRAUN, *Assistant Examiner.*